May 12, 1970     L. SCHAFER     3,511,189

PASTRY TWISTER

Filed May 31, 1968

United States Patent Office 3,511,189
Patented May 12, 1970

3,511,189
PASTRY TWISTER
Leonhard Schafer, New York, N.Y.
(2770 Briggs Ave., Bronx, N.Y. 10454)
Filed May 31, 1968, Ser. No. 733,512
Int. Cl. A21c 3/08
U.S. Cl. 107—8                               5 Claims

ABSTRACT OF THE DISCLOSURE

A device for producing a full or 360 degree twist in a planar piece of pastry. The device uses a mechanically actuated levered arm with seizure hand to grasp one end of said pastry, the other end being firmly held during the the twisting or complete rotation of the seized portion.

It is an objective of this invention to provide a mechanical device for producing a full twist in a planar, rectangular piece of pastry.

It is another objective to provide a device of economical construction and one that may be automated for continuous operation.

These and other objectives of this invention will become apparent upon reading the following descriptive disclosure of an illustrative embodiment shown in the accompanying drawing in which.

Figure 2:
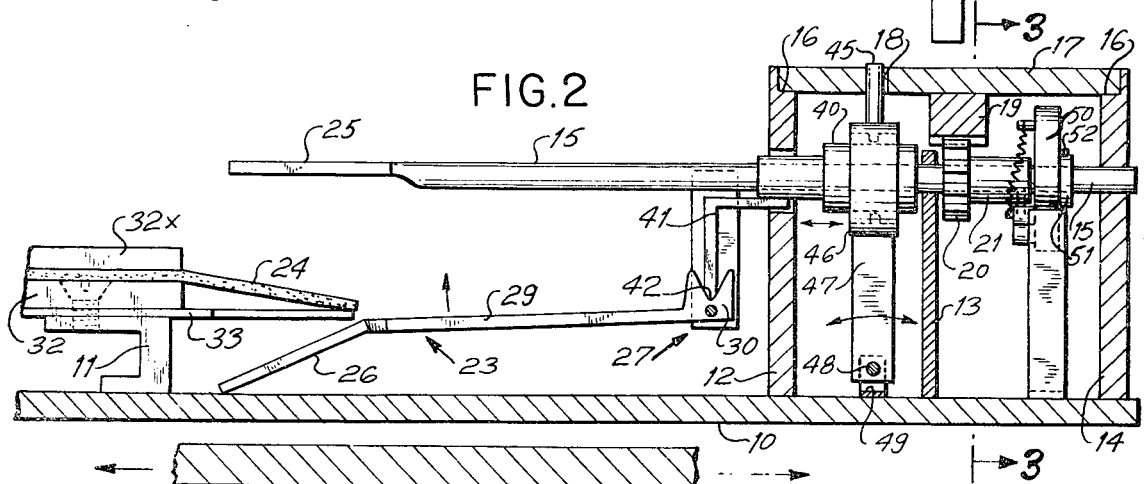
FIG. 2 is a section view taken on line 2—2 of FIG. 1 and showing the cam operated lever arm and the manner of elevating the arm in pastry seizing relationship, and showing further the rack and free wheeling pinion manner of rotating the pastry seizing means after effecting a seizure thereof.
Figure 3:
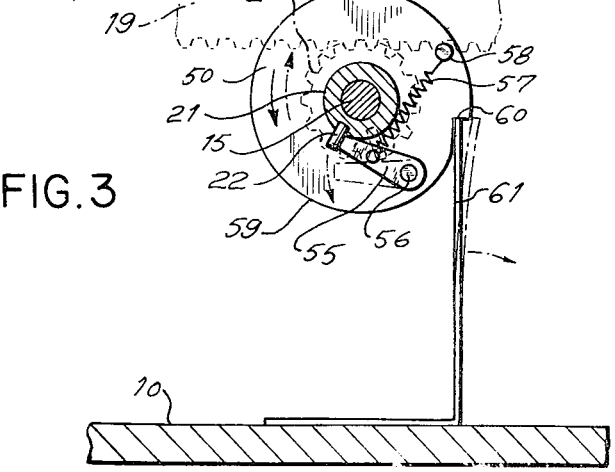

FIG. 3 is a section view taken substantially in line 3—3 of FIG. 2 and in detail showing a spring loaded slip clutch arm for engaging said free wheeling pinion disposed on the pastry rotating shaft, and showing also the manner of slip engaging said clutch arm to an abutment disposed on the pinion collar, said clutch arm being secured to a rim notched substantially round disc fixedly mounted on said rotatable shaft.

Figure 4:
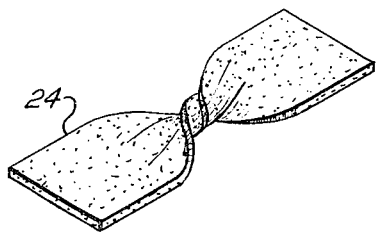

FIG. 4 is a perspective view of a planar piece of pastry twisted 360 degrees to present both of the coated halves upwardly.

Figure 5:
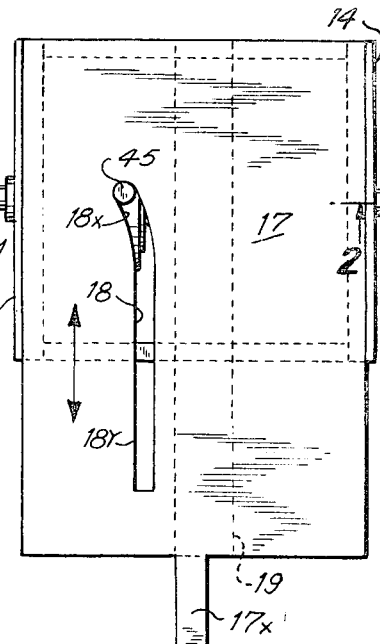
Figure 5:
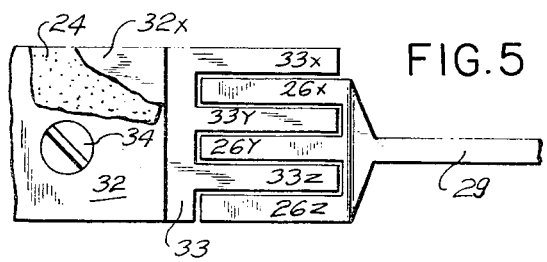

FIG. 5 is a detail view showing the mechanism for lifting an end portion of the planar pastry using a three finger hand disposed at the end of the lever arm, said fingers passing through the spaces formed in a three fingered stationary holding plate.

Turning to the drawing, a base 10 is provided with a U-shaped angle iron fixed support 11 at one end and with a plurality of suitably wide fixed upright plate supports 12, 13 and 14 at the other end.

An axle 15 is disposed in supports 13 and 14 and extends through an oversized aperture in plate 12. The top edges of supports 12 and 14, are each provided with ledges 16 to slidingly engage a movable plate 17 having a cam slot 18 therein. The slot 18 comprises a pastry seizure performing portion of curved configuration 18X communicating with a linear portion 18Y for rotation of said axle.

A linear rack 19 is welded to the underside of slide plate 17 and engages a free wheeling pinion 20 integral with a pinion collar 21 having an abutment pin 22 fixed therein (FIG. 3).

In order to push or pull plate 17 and thus operate rack 19 fixed thereto, a handle 17X is provided, although electrical means may be used as the motivating power.

An important feature of this invention is the provision of an integral arm and hand lever or element 23, which engages an overhanging portion of linear pastry 24 and presses it seizingly against a flat palm plate 25 integral with the extended end of axle 15.

In order to cause the levered arm and hand element 23 to engage the palm plate 25 and then effect rotation of the pastry seized between flat plate 25 and the three fingered hand 26, an aperture U-shaped bracket 27 is welded at the top of both of its legs 28 to axle 15. The lever arm 29 is provided at the end opposite that having the hand 26 with an apertured V-shaped rocker plate 30.

A wing pin 31 is disposed through the apertures of the rocker plate 30 and the co-acting apertures in legs 28 of bracket 27.

Figure 1:
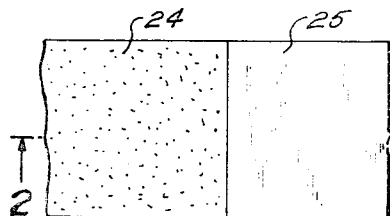
FIG. 1 is a top plan view of the device showing the cam slot in a reciprocally movable plate used to actuate the lever arm of the seizure element and showing the top seizure hand disposed over a piece of planar pastry.

As shown in FIGS. 1 and 2, the pastry 24 is disposed on block 32 and held down thereon by a mechanical plate 32X. A plate 33 is secured to a threaded aperture in angle iron support 11 and block 32 by means of bolt 34. As shown in FIG. 5, the fixed plate 33 is provided at its free end with extending fingers 33X, 33Y and 33Z. Also the arm 29 is provided with a three fingered hand 26, having fingers 26X, 26Y and 26Z which pass between the fingers of plate 33 to lift the overhanging pastry off block 32 to seizure engagement with the palm plate 25 on axle 15.

In order to elevate the free end of the lever arm 29 with its pastry load on hand 26 into firm seizure with the plate 25 and thereafter rotate with axle 15 as a unit, a slide collar 40 is slidably disposed on axle 15 below the cam slot 18. The slide collar 40 is provided with a right angle hook 41 welded thereto. The base point 42 of the hook 41 is hemispherical and is slidingly disposed in the V-notch of the rocker plate 30, so that movement of collar 40 to the right (FIG. 2) causes the hook 41 to move rightwardly and thus to raise the hand 26 of the lever arm 29 toward the palm plate 25.

As shown in FIG. 2, the collar 40 and its fixed hook 41 extend freely through the oversized aperture in plate 12. The correct timed operation of the slide collar 40 is produced by pushing the cam plate 17 inwardly thereby causing the cam slot 18X to push pin 45 located therein. Pin 45 is secured to a gimbal ring 46 which swingably engages said collar 40. Ring 46 is fixed to plate support plate 47 and the latter is secured to bracket support 49 pivotally by means of a pivot pin 48. Thus ring 46 which reciprocates plate 47 but a few degrees due to the slight curve of slot 18X, causes the collar 40 to move sufficiently to cause hook 41 to rock the lever 29 to produce a firm seizure of hand 26 to palm plate 25, with pastry 24 therebetween. Next the axle is rotated 360 degrees.

To produce the complete rotation of the seized pastry, it is necessary to rotate the axle 15 a full circle. This is done by engaging the free wheeling pinion 20 through its abutment pin 22 to a drive plate 50 fixedly secured to axle 15. The drive plate 50 is secured to axle 15 by means of a set screw 52 located in the integral flange 51 of plate 50.

As shown in FIG. 3, a spring loaded swingable clutch pin 55 is hingedly secured to plate 50 by pivot pin 56. A coil spring 57 is fastened at one end to a pin 58 located in the drive plate 50 and at the other end to the swingable clutch pin 55. Thus, inward movement of plate 17 causes the clutch pin 55 to timely engage the abutment pin 22, so that now the axle rotates with continued inward movement of said cam plate 17.

The plate 50 is substantially circular and is provided with a rim 59 having a rim notch 60 cut radially therein. A leaf spring 61 is secured to the base 10 and is continuously urged in rubbing contact against rim 59. The rim notch 60 permits only counterclockwise rotation of plate 50 and thus of the axle 15 affixed thereto.

The return movement of plate 17 is produced by pulling the handle 17X outwardly to cause clockwise rotation of abutment pin 22 to thereby force the spring loaded clutch pin away from the axle 15, as shown in dotted outline in FIG. 3, over and beyond said pin 22. Further pulling of the plate 17 causes pin 45 in slot 18X to move collar 40 and its hook 41 to actuate the lever arm 29 downwardly to release the twisted pastry from its seized condition between hand 26 and palm plate 25.

For continuous operation, preferably two twisting units are used in opposing relationship using two specimens on each block 32 of a series of moving blocks 32. Thus the twisting devices remain stationary but the pastry units are conveyed into operative position thereto.

I claim:

1. A device for producing a full twist in a strip of pastry comprising base plate means; upright support means secured to said base plate means; an axle having a palm plate on an extended end horizontally disposed in said support means; a cam plate having a suitable cam slot therein disposed over said axle and slidably mounted upon said support means; collar means slidably disposed on said axle, said collar having a pin therein slidingly disposed in said cam slot; hook means fixedly secured to said collar means; bracket means fixedly secured to said axle; a lever arm having at one end a V-channel therein pressure engaging said hook means and pivotally secured beneath said channel to said bracket means, said lever arm having hand means at the other end for engaging said pastry seizingly to said palm plate; rack means fixedly secured to said cam plate; pinion means engaging said rack means and freely mounted on said axle; and clutch drive means fixed to said axle for timed engagement of an abutment pin on said pinion means to produce a complete rotation of said axle and attached lever arm seizing said pastry.

2. The device of claim 1 wherein said hand means is a three fingered hand adapted to co-act with a three fingered stationary holding plate supporting an extended pastry portion for lifting-seizing engagement to said hand.

3. The device of claim 2 wherein the cam slot is provided with a relatively short curved length for producing a seizure closing of said hand means to said palm plate with the extended pastry portion therebetween, said curved slot communicating with a linear slot length for producing full rotation of said axle.

4. The device of claim 3 wherein said clutch drive means is a substantially circular plate having a radially cut rim notch therein for co-action with a leaf spring to prevent clockwise rotation of said circular plate and affixed axle thereto.

5. The device of claim 4 wherein the clutch of said clutch means is a spring loaded pivoted arm adapted to slip over said abutment pin on the return travel of said cam plate.

References Cited

UNITED STATES PATENTS

| | | | |
|---|---|---|---|
| 2,843,062 | 7/1958 | Kieffaber | 107—8 |
| 2,857,859 | 10/1958 | Adams | 107—8 |

WALTER A. SCHEEL, Primary Examiner

R. I. SMITH, Assistant Examiner